United States Patent [19]

Smith

[11] Patent Number: 5,116,011

[45] Date of Patent: May 26, 1992

[54] ACCESSORY TRACK TO ACCOMMODATE MULTIPLE ACCESSORIES

[76] Inventor: Lawrence E. Smith, 1903 Cedar La., Melbourne Beach, Fla. 32951

[21] Appl. No.: 616,331

[22] Filed: Nov. 21, 1990

[51] Int. Cl.⁵ .............................................. A47B 91/00
[52] U.S. Cl. .................................. 248/346; 108/23; 108/27; 108/28
[58] Field of Search ............. 248/346, 176, 186, 349, 248/922, 918, 917, 127; 108/23, 27, 28, 33, 39; 312/349

[56] References Cited

U.S. PATENT DOCUMENTS

| | | | |
|---|---|---|---|
| 1,856,160 | 5/1932 | Gutberlet | 248/346 X |
| 3,065,334 | 11/1962 | Hillenbrand | 312/349 X |
| 3,219,401 | 11/1965 | Mapson | 108/27 X |
| 3,428,002 | 2/1969 | McIntyre | 248/346 |
| 4,088,081 | 5/1978 | D'Arca | 108/27 |
| 4,561,619 | 12/1985 | Robillard | 248/918 X |
| 4,654,762 | 3/1987 | Laverick | 108/23 X |
| 4,852,500 | 8/1989 | Ryburg | 248/918 X |
| 4,863,124 | 9/1989 | Ball | 108/28 |
| 4,934,541 | 6/1990 | Bussan | 108/27 X |
| 4,974,808 | 12/1990 | Ball | 248/917 |

*Primary Examiner*—J. Franklin Foss
*Attorney, Agent, or Firm*—Evenson, Wands, Edwards, Lenahan & McKeown

[57] ABSTRACT

An accessory track apparatus have a track disposed at a peripheral region of a top plate supporting a piece of equipment such as a personal computer. One or more accessory holders are inserted into the track by way of an octagonal anchor plate on the holders, which anchor plate allows insertion and removal of the holders at corners of the track. A space or cavity between the top support plate and track allows for 360° routing of electrical wiring of up to several feet in length.

10 Claims, 2 Drawing Sheets

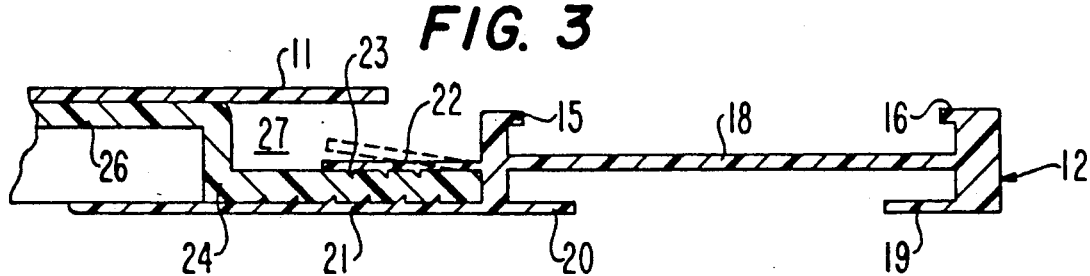
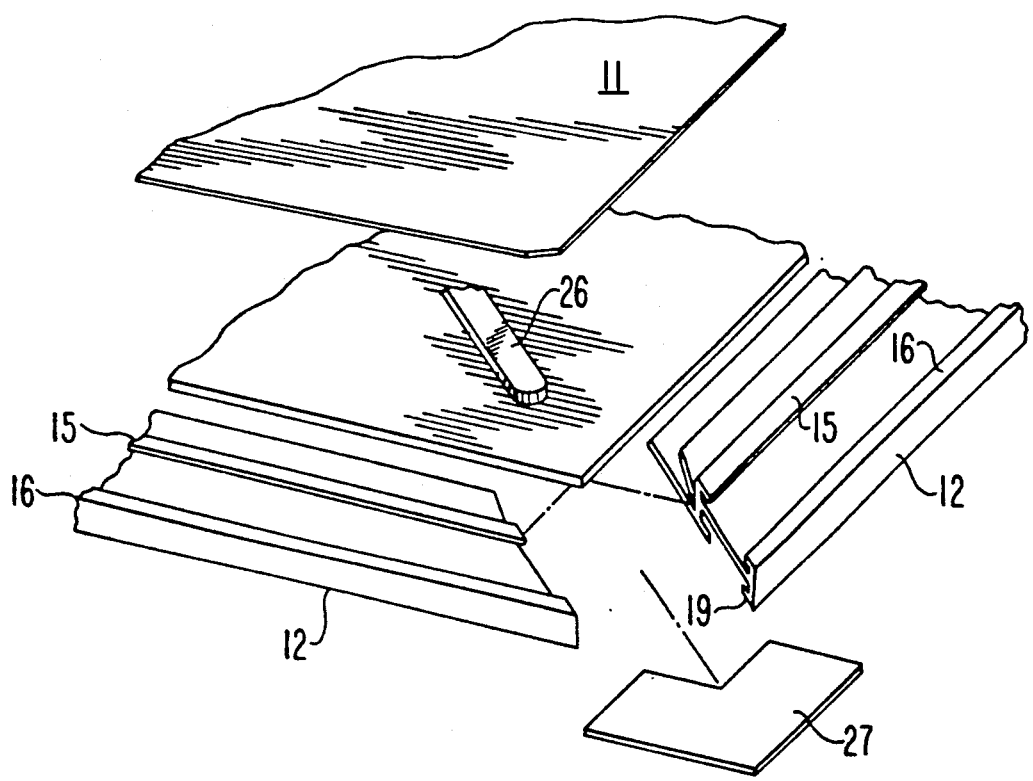
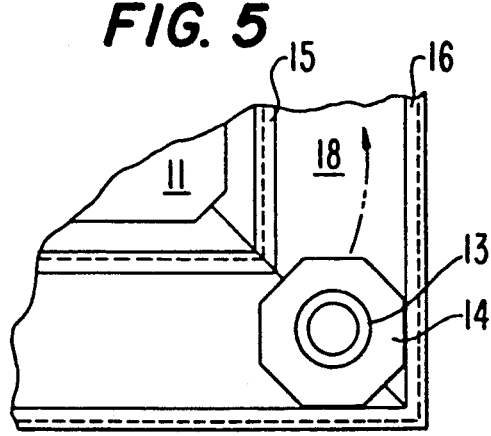

ACCESSORY TRACK TO ACCOMMODATE MULTIPLE ACCESSORIES

BACKGROUND AND SUMMARY OF THE INVENTION

The present invention relates to an accessory track apparatus for accommodating multiple accessories and, more particularly, to an accessory track apparatus which uses accessory anchors which may be added at the corners of a track and moved to any desired position along the track with the center of gravity of each accessory transferred to the track so as to allow multiple accessories to be secured stably in close proximity to a user's central equipment such as a personal computer.

Work space in proximity to many pieces of equipment is extremely limited due to the size of the equipment and the available surrounding area. There is a need to maximize the utilization of available space to accommodate such equipment with multiple accessories, i.e., task lighting, extension cords, additional reference or work space, key board support, equipment supplies, note taking boards, copy holders, security or glare shields, microphones, telephones, and electrical port attachments (eg., mouse, light pen, etc.)

While devices have been introduced for individual items (for example, clamps to attach to the lip of a work surface to anchor a task lamp; sheet metal to slip under a computer to anchor a copy board, metal housing and/or brackets to support key boards), they do not allow for the interchangeability of accessories or for multiple usage. In addition, current products do not address work surface wire management.

It is an object of the present invention to overcome the disadvantages encountered with currently available products by providing a system of tracks and accessory anchor plates. Another object of this system is to provide efficient use of limited space while securing with ease of adjustment and change, multiple accessories in close proximity to a central item, eg., computer, monitor, copier, fax, cash register and the like.

It is yet another object of the present invention to allow for easy insertion and sliding movement of anchors with accessories attached so that the user can easily add, remove or adjust the accessory relative to the piece of equipment.

The accessory plates slide through a track and thereby anchor each attaching accessory by transferring its center of gravity to the track system or framework. The track may, but need not, be used around the full perimeter of the central or host equipment. The host equipment provides further anchoring capability by its weight when applied to the inside lip of the track.

Male and/or female accessory anchors may be added at any opening in the track which can be at a corner and slid to any desired work position along the track. In addition, when the track is joined with a top and a bottom plate, a cavity is provided for the insertion, enclosure and routing of wiring. The bottom plate may also be attached to a lazy susan-type mechanism which allows for the full rotation of the entire assembly, including host equipment, track, accessories and wiring, without disruption of components. This is particularly meaningful when the host equipment is used by multiple operators.

The track may be used in the horizontal or vertical planes. In a vertical configuration it may encompass a monitor where horizontal space in unavailable, eg., a bookcase.

Still another object of the present invention is to provide for insertion and routing of wiring over a 360° range and also for enclosing several lengths of wiring depending on size and number.

BRIEF DESCRIPTION OF THE DRAWINGS

These and other objects, features and advantages of the present invention will become more apparent from the following detailed description of a presently preferred embodiment when taken in conjunction with the accompanying drawing wherein:

FIG. 3 is a cross-sectional, elevation view of the accessory track shown on FIG. 2;

FIG. 4 is an exploded perspective view of the accessory track shown in FIGS. 1-3; and FIG. 5 is an isolated plan view of a corner of the accessory track showing how an anchor plate is removed and inserted in the tracks.

DETAILED DESCRIPTION OF THE DRAWINGS

Figure 1:
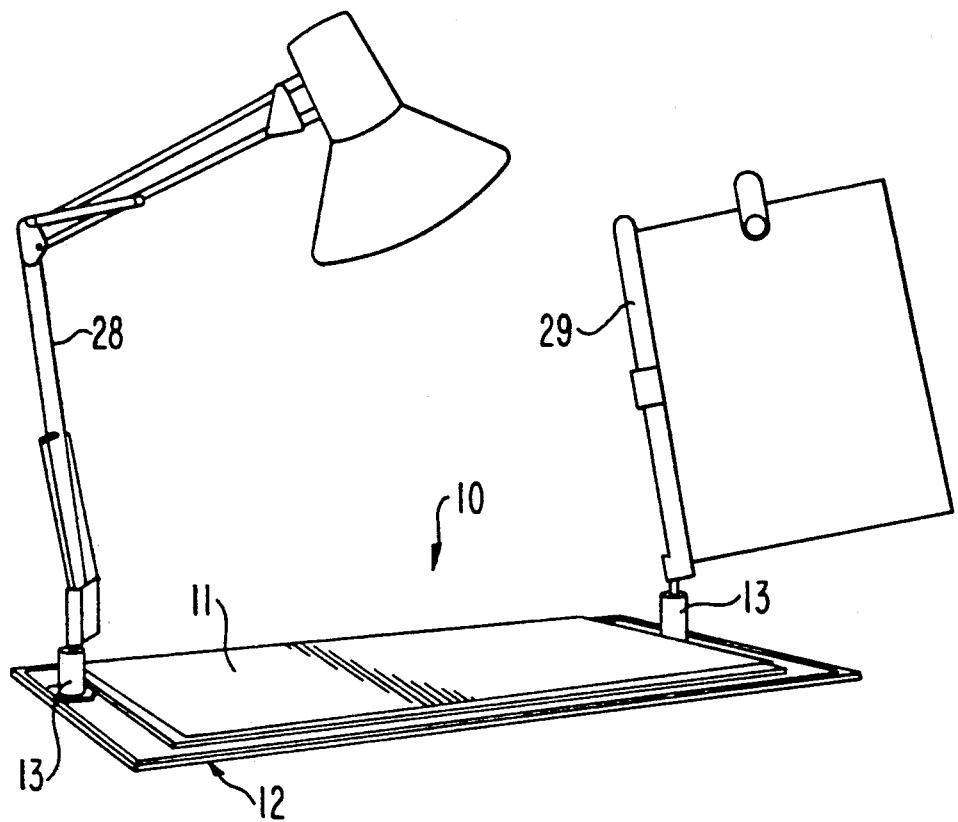
FIG. 1 is a perspective view of the accessory track apparatus of the present invention on which multiple accessories, for example a lamp and copy board are arranged.

Referring now to FIG. 1, an accessory track apparatus in accordance with the present invention is designated generally by the numeral 10. This track apparatus 10 has an upper or top support surface 11 which can be used as a support surface for equipment such as a host CPU and monitor (not shown). A perimeter region 12 of the track apparatus 10 has a track which accommodates one or more anchoring devices 13 which have an anchor plate 14 (FIG. 2) configured in the illustrated embodiment as an octagonal plate and sized to slip in between rail guides 15, 16 defined by inverted L-shaped portions and constituting the track. The octagonal shape of the anchor plate 14 allows each plate to be inserted at a corner region 17 of the track apparatus 10.

Figure 2:
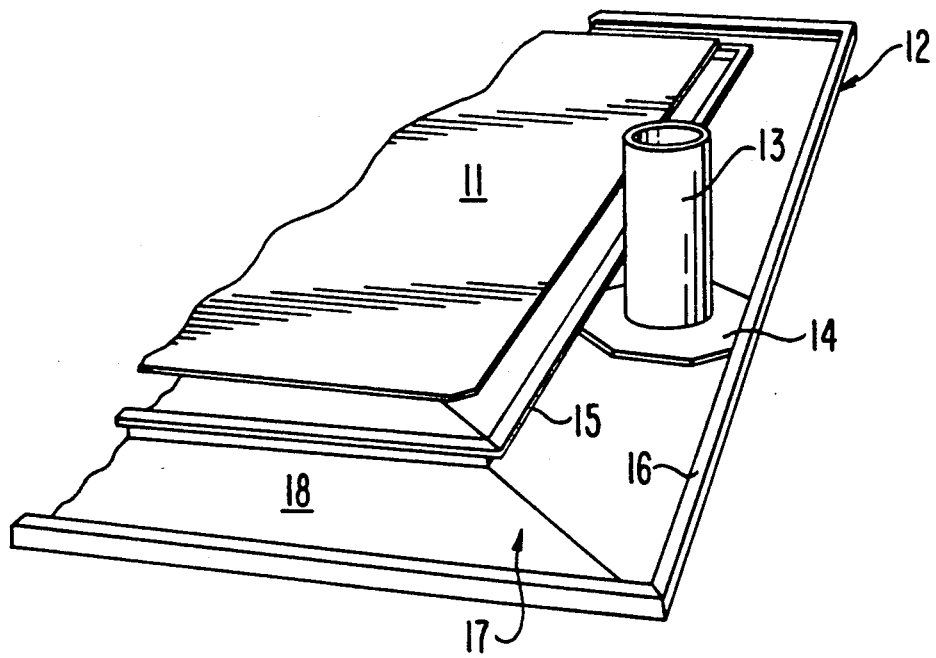
FIG. 2 is a partial perspective view of the accessory track of FIG. 1, but on a somewhat more enlarged scale, showing details of the track itself as well as one cup and anchor plate for holding an accessory.

As shown in FIG. 2, the perimeter region 12 has a channel-like profile which can be made from extruded material such as tempered aluminum or other suitable, lightweight metal. The ends of the tracks are bevelled at the corner region 17 so as to form an orthogonal angle. The channel profile (FIG. 3) includes the rail guides 15, 16, a track 18 extending between the rail guides and upon which the anchor plate 14 sits, a base 19 which underlies the rail guide 16 and a base 20 which underlies the rail guide 15. In addition, the base 20 is a relatively long piece which extends toward the interior of the apparatus 10 with serrations 21 formed on an upper surface thereof. Another piece 22 extends from the channel profile and has serrations 23 formed on a lower surface thereof. A plate or sheet 24 made of embossed PVC or other suitable material is inserted between the pieces 20, 22 and is held securely therebetween by the serrations 21, 23 which are pressed into the plate or sheet 24. To allow for easy assembly, the piece 22 is initially in the upward position shown by the dash lines in FIG. 3. Then, after the plate 24 is inserted between the pieces 20, 22, the piece 22 is pressed downwardly to force the serrations 21, 23 into the plate 24 and securely hold the apparatus 10 together.

As shown in FIG. 4, the top support plate 11 is secured to the plate or sheet 24 and is spaced therefrom by projections 26 which can be located symmetrically around the sheet 24 or, alternatively, at the bottom surface of the top plate 11 (not shown). This spaced arrangement defines a recess 27 under the top plate 11 around which electrical power cord wires can be wrapped for storage and routing purposes. A piece of equipment, such as a PC, can rest on the top surface of the support plate 11. As shown in FIG. 4, a corner key 27 is accommodated between the bottom surface of the track 18 and pieces 19, 20 and is used securely to connect the two metered perimeter track regions 12.

Almost any number of anchoring devices 13 can be inserted onto the track 18 at a corner, as shown in FIG. 5, and thereafter moved to a desired location on the track. For instance, the apparatus 10 in FIG. 1 shows two such anchoring devices, one holding a lamp 28 and the other holding a note pad 29. Although the illustrated anchors 13 are shown as female receptacles, they can also be configured as male members for insertion into a female accessory without departing from the scope of the present invention.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. An apparatus for accommodating multiple accessories, comprising a generally planar top support plate having an accessory track disposed around a peripheral portion thereof, and at least one accessory holder sized and configured to be easily inserted directly into the accessory track at at least one position therealong without removal of any parts and thereafter moved along the accessory track to a desired location where the accessory holder is form-lockingly retained by the accessory track.

2. The apparatus according to claim 1, wherein the accessory track is provided with serrations arranged and configured to effect secure attachment of the accessory track to the support plate.

3. The apparatus according to claim 1, wherein the accessory track includes guide rails to transfer weight of an accessory associated with the at least one accessory holder to the apparatus.

4. The apparatus according to claim 1, wherein means is provided for operatively associating the top support plate and the accessory track such that wiring can be accommodated under the top support plate.

5. The apparatus according to claim 3, wherein the at least one accessory holder includes an octagonal anchor plate sized to slide between the guide rails.

6. The apparatus according to claim 5, wherein the accessory track forms at least one right angle corner around the top support plate, and the at least one accessory holder is adopted to be inserted into and removed from the accessory track at the at least one corner.

7. The apparatus according to claim 6, wherein means is provided for operatively associating the top support plate and the accessory track such that wiring can be accommodated under the top support plate.

8. The apparatus according to claim 7, wherein the means is a cavity which permits a 360° routing of the wiring.

9. A method for accommodating accessories in a track disposed peripherally around a piece of equipment resting on a top support plate, comprising the steps of:
    directly inserting at least one holder into the track at a corner of the track without removal of any parts, and moving the at least one holder to a desired location on the track where the at least one holder is form-lockingly retained by the track.

10. The method according to claim 9, further including accommodating electrical wiring on a space between the track and the top support plate for 360 routing.

* * * * *